US006794770B2

(12) United States Patent
Kirby

(10) Patent No.: US 6,794,770 B2
(45) Date of Patent: Sep. 21, 2004

(54) INTERFACE CONTROL SWITCH

(75) Inventor: Robert L. Kirby, Sparta, TN (US)

(73) Assignee: Tutco, Inc., Cookeville, TN (US)

( * ) Notice: Subject to any disclaimer, the term of this patent is extended or adjusted under 35 U.S.C. 154(b) by 4 days.

(21) Appl. No.: 10/132,700

(22) Filed: Apr. 26, 2002

(65) Prior Publication Data

US 2002/0195322 A1 Dec. 26, 2002

Related U.S. Application Data

(60) Provisional application No. 60/286,359, filed on Apr. 26, 2001, and provisional application No. 60/286,339, filed on Apr. 26, 2001.

(51) Int. Cl.[7] ............................ H02B 1/24; H01H 9/00; H01C 10/36

(52) U.S. Cl. ............................ 307/115; 200/4; 200/18; 338/172

(58) Field of Search ................................ 200/1 R, 1 B, 200/4, 6 R, 6 A–6 C, 6 BA, 6 BB, 11 R–11 TW, 18, 5 R, 5 A; 307/112–115; 338/172

(56) References Cited

U.S. PATENT DOCUMENTS

| | | | | | |
|---|---|---|---|---|---|
| 1,528,300 | A | | 5/1925 | Noonan | |
| 3,739,110 | A | | 6/1973 | Constable | |
| 4,227,062 | A | | 10/1980 | Payne et al. | |
| 4,711,988 | A | | 12/1987 | Thaler et al. | |
| 4,724,286 | A | * | 2/1988 | Cummins | 200/4 |
| 4,827,241 | A | * | 5/1989 | Riser et al. | 338/172 |
| 4,885,434 | A | * | 12/1989 | Vultaggio et al. | 200/4 |
| 5,126,537 | A | | 6/1992 | Kadwell et al. | |
| 5,140,111 | A | * | 8/1992 | Vultaggio et al. | 200/4 |
| 5,150,095 | A | | 9/1992 | Jones | |
| 5,264,821 | A | * | 11/1993 | Vultaggio et al. | 338/172 |
| 5,451,746 | A | | 9/1995 | Kadwell et al. | |
| 5,467,423 | A | | 11/1995 | Jakubowski | |
| 6,079,401 | A | | 6/2000 | Alvord et al. | |
| 6,153,837 | A | | 11/2000 | Garcia et al. | |
| 6,218,645 | B1 | | 4/2001 | Bizard | |
| 6,365,988 | B1 | | 4/2002 | Imer et al. | |

* cited by examiner

*Primary Examiner*—James R. Scott
(74) *Attorney, Agent, or Firm*—Clark & Brody

(57) ABSTRACT

A switch assembly includes a shaft, a first switch and a second switch, a potentiometer including a first and a second terminal, and an electric controller. The first switch is coupled to a first device, whereas the second switch is coupled to a second device. The shaft is coupled to the first switch and the second switch, and is moved to a first position to selectively connect power, through the first switch, to the first device, and to a second position to selectively connect power, through the second switch, to the second device. The potentiometer is coupled to the shaft, and provides a variable resistance between the first and the second terminal in relation to the movement of the shaft. The electric controller is coupled to the potentiometer, and electrically controls the power to the first device and/or the second device in relation to the variable resistance between the first and the second terminal of the potentiometer.

19 Claims, 4 Drawing Sheets

INTERFACE CONTROL SWITCH

This application claims the benefit of U.S. Provisional Application No. 60/286,359, filed on Apr. 26, 2001, and U.S. Provisional Application No. 60/286,339, filed on Apr. 26, 2001.

FIELD OF THE INVENTION

The present invention relates in general to control assemblies. In particular, the present invention relates to an interface control switch.

BACKGROUND OF THE INVENTION

The combination of an off/on switch, or set of contacts used to energize and de-energize an electronic circuit from a power source is known. A potentiometer including a three terminal resistor with an adjustable center connection that can change the output resistance by moving the center tap from one end of the potentiometer to the other has been used as a control device. Both of the previous controls are activated by the rotation of a shaft. This type of control is used for power and volume control in radio and television receivers.

Another type of switch/control used in appliances, such as electric ranges is the infinite switch or electromechanical energy regulator. This type of switch/control has internal contacts used to energize and de-energize an electrical circuit, or to perform the off/on power control to a heating element. This type of switch also performs another function by incorporating a bimetal strip connected to the contacts that energize and de-energize the heater. When the bimetal strip is heated, one side of the strip expands faster than the other side. This action opens the contacts stopping the current flow to the heater. As the strip cools the bimetal strip returns to its original position and the contacts close which re-energizes the heater. The bimetal strip can be heated by the use of a small heater in close proximity to the strip or by passing current through the bimetal strip and heating it internally. The amount of time the switch is closed or open can be adjusted by varying the amount of pressure used to restrict the movement of the bimetal strip.

SUMMARY

One embodiment of the present invention provides a switch assembly, including a shaft, a first switch and a second switch, a potentiometer including a first and a second terminal, and an electric controller. The first switch is coupled to a first device, whereas the second switch is coupled to a second device. The shaft is coupled to the first switch and the second switch, and is moved to a first position to selectively connect power, through the first switch, to the first device, and to a second position to selectively connect power, through the second switch, to the second device. The potentiometer is coupled to the shaft, and provides a variable resistance between the first and the second terminal in relation to the movement of the shaft. The electric controller is coupled to the potentiometer, and electrically controls the power to the first device and/or the second device in relation to the variable resistance between the first and the second terminal of the potentiometer.

BRIEF DESCRIPTION OF THE DRAWINGS

In the drawings, like reference numerals represent similar parts of the illustrated embodiments of the present invention throughout the several views and wherein.

DETAILED DESCRIPTION

Figure 1A:
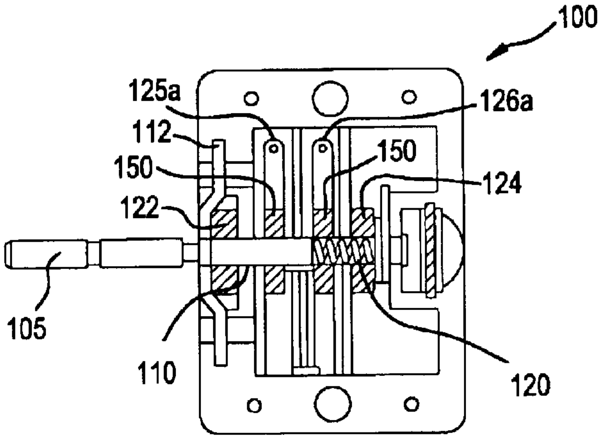
FIGS. 1A, 1B, 1C, ID, 1E, 1F, and 1G are cross-sectional views of an embodiment of a switch assembly.
Figure 1B:
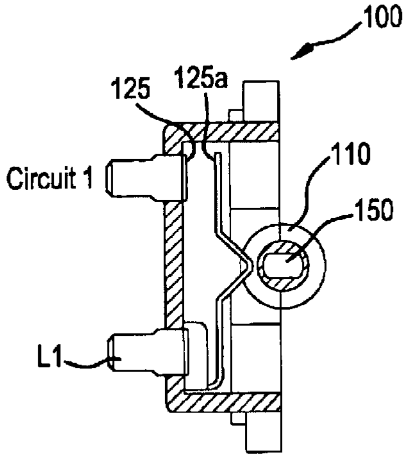
Figure 1C:
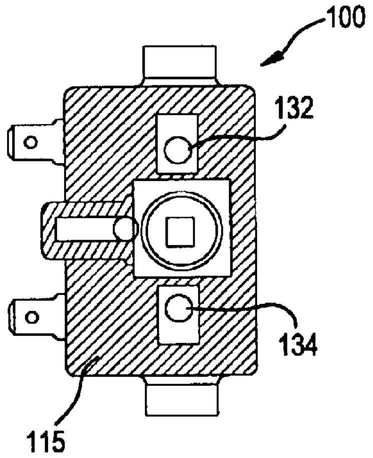
Figure 1D:
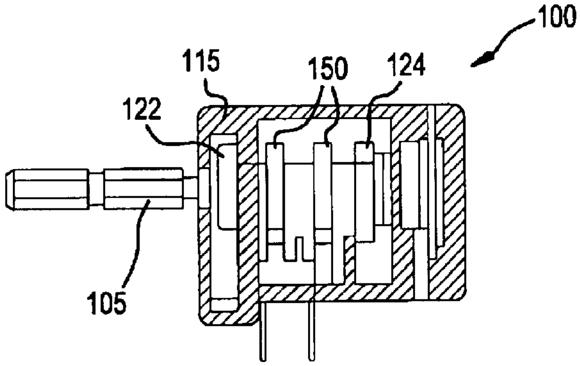

One embodiment of a switching apparatus 100 (see FIGS. 1 and 2) allows a user to interface with an electronic controller, which may energize an electric heater from a single alternating current voltage supply. The switch 100 may include two sets of dry contacts. One set of contacts 125, 125*a* breaks the current to the heater and/or other device being controlled. A second set of contacts 126, 126*a* energizes a warning light and/or other signal device for feedback to the user. The contacts 125,125*a*, and 126, 126*a* are activated by rotating a switch shaft 105. The switch shaft 105 is coupled to a camshaft 110 that can open (see FIG. 1B) and close the contacts 125, 125*a*, and 126,126*a* through cams 150, at predetermined angles of rotation. The contacts 125, 125*a*, and 126,126*a* can either open and close at the same angle of rotation and/or can be set to open and close at different angles in the rotation of the shaft. A switch housing 115 has halves 115*a* and 115*b*, each configured with recesses and shapes to interface with the various components of the switch. A mounting bracket 112 and spring 114 are provided in a top portion of switch housing half 115*a*.

One end of the switch shaft 105 can be fitted with a knob 106 for ease of use. The other end of the switch shaft 105 goes through the switch housing 115 and is coupled to the camshaft 110. The switch housing halves 115*a* and 115*b* together enclose the camshaft 110 and contacts 125, 125*a*, 126, 126*a*. The switch shaft 105 may slide into the camshaft 110. A spring 120 is placed inside the camshaft 110 and between the camshaft 110 and the switch shaft 105. This spring 120 applies a force on the switch shaft 105 to hold the shaft 105 in an extended position. Appropriate stops (not shown) are placed on the shafts to keep them from coming apart when the switch shaft 105 is in its extended position. Stops 122 and 124 located in the switch housing 115 may not allow the shaft 105 to be rotated unless sufficient force is applied to the switch shaft 105. To activate the switch the user may first push the switch shaft 105 inward a predetermined distance, with a predetermined amount of force to rotate the shaft 105. To deactivate the switch the user rotates the shaft 105 back to the off position. The internal spring 120 forces the switch shaft 105 back into the locked position. This gives the switch 100 a two step on, and one step off feature, required for safety agency approvals.

Figure 2:
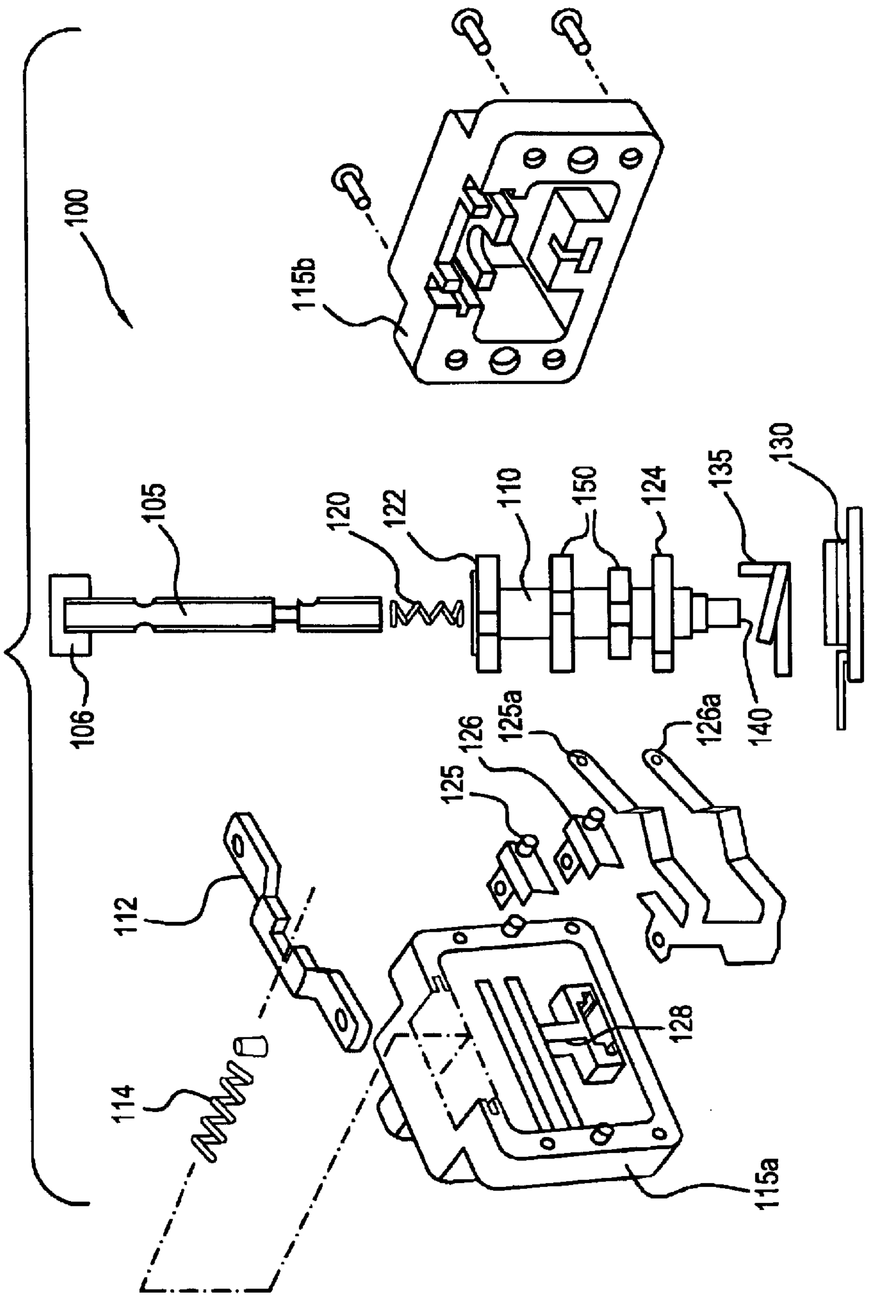
FIG. 2 is a perspective view of the switch assembly of FIG. 1, wherein the components of the switch assembly are detached.

One end of the camshaft 110 is interconnected with the wiper or center contact 140 of a potentiometer 130 (see FIG. 2). When the camshaft 110 is rotated, the resistance between the output pins or terminals 132 and 134 of the potentiometer 130 changes in relationship to the angular position of the shaft. The analog potentiometer 130 incorporated in the switch allows for a variable output. The output may be used to interface the mechanical movement of the potentiometer with a micro controller. This allows manual selection of anyone of a predetermined number of power settings for the heater or other device from the power supply (see FIG. 3).

Figure 1E:
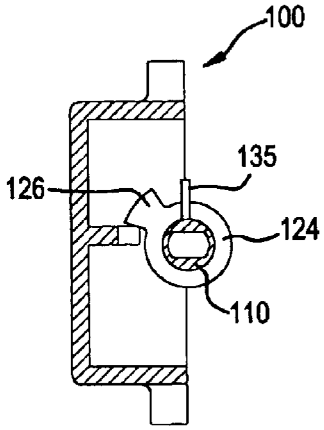
Figure 1F:
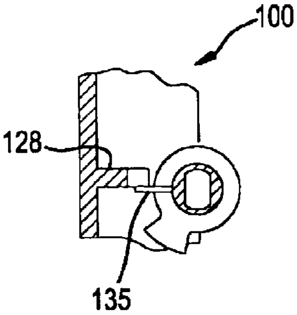
Figure 1G:
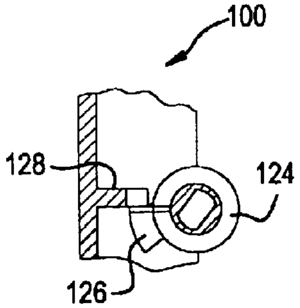
Figure 3:
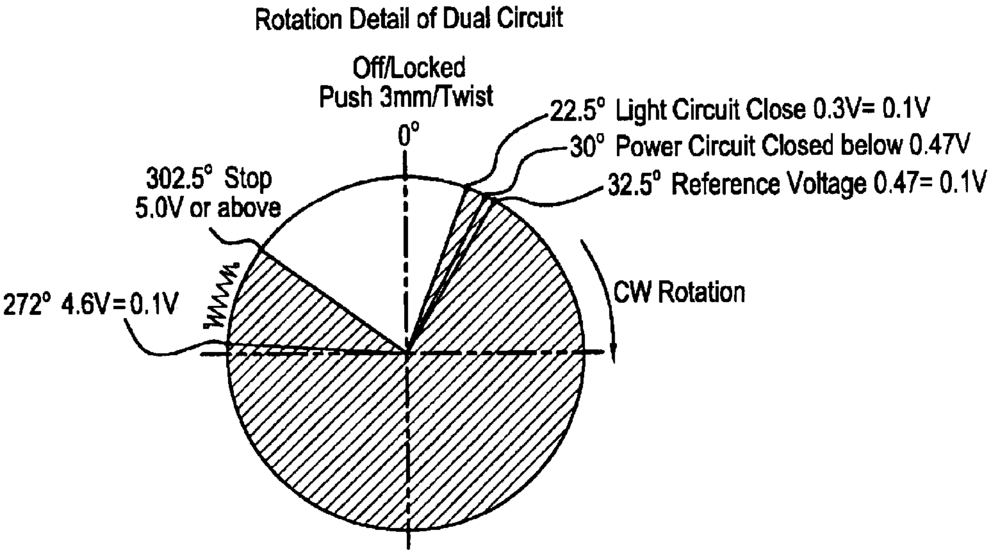
FIG. 3 is a rotational chart of one embodiment of a switch assembly.

Referring now to FIGS. 1E–1F and FIG. 3, the switch 100 may include a temporary stop spring 135. This spring 135 rotates with the camshaft 110 and limits the rotation of the camshaft 110 at a predetermined stop point. In FIG. 1E, the cam stop 24 and spring 135 are at a first position. Rotation of the cam shaft 110 causes the spring 135 to contact the post 128. This stop point alerts the end user that full power is applied to the equipment being controlled after the temporary stop is reached. A second condition can be achieved by applying additional rotational force to the shaft 110 to overcome the spring tension of the temporary stop spring 135, whereby the cam stop portion 126 contacts the post 128 to the ultimate stop point. This allows the center tap 140 of the potentiometer 130 to complete its travel to its end stop position. When the applied force is removed, the shaft returns to the temporary stop position. This action can be used as a momentary switch to signal the micro controller to perform another function.

Figure 4:
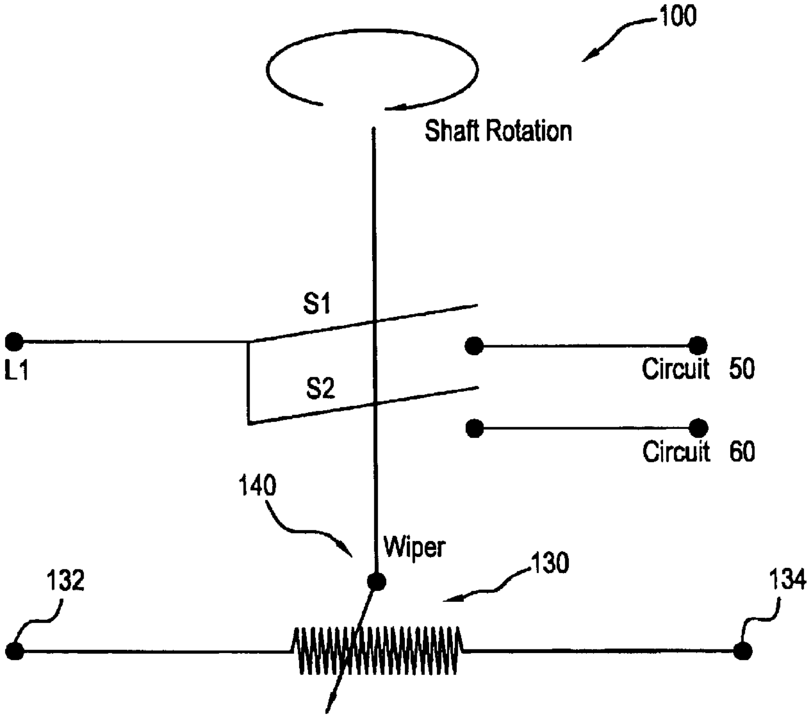
FIG. 4 is a flow diagram of the switch assembly of FIG. 1.

FIG. 4 illustrates a use of a switch assembly. The switch assembly includes a shaft, a first switch S 1 and a second switch S 2, a potentiometer 130 including a first and a second terminal 132, 134. The first switch S 1 may coupled to a first device (not shown but represented as circuit 50). The second switch S 2 may be coupled to a second device (not shown but represented as circuit 60). The first device may include a heating element 510, whereas the second device may include an indicator 515 such as, for example, a light (see FIG. 5). The shaft 110 is coupled to the first switch S 1 and the second switch S 2, and may be manually pushed and turned (i) to a first position to selectively connect power, through the first switch, to the first device, and (ii) to a second position to selectively connect power, through the second switch, to the second device. The potentiometer 130 is coupled to the shaft 110, and provides a variable resistance between the first and the second terminals 132 and 134 in relation to the manual rotation of the shaft assembly. A controller (not shown) is coupled to the potentiometer 130, and controls the power to the first device and/or the second device in relation to the variable resistance between the first and the second terminal of the potentiometer. The controller may include an electric controller 505, see FIG. 5. The electric controller 505 may then electrically control the power to the first device and/or the second device.

In sum, the power contacts can be activated and deactivated at different angles of rotation of the shaft. This permits some event such as starting a cooling fan to occur before starting the next event such as energizing a heater. The potentiometer addresses the two step on and one step off function, required for safety agency approval. The potentiometer when used as an on/off switch can withstand the high current requirements when energizing and de-energizing a load such as a heater. The potentiometer may include a temporary stop (in the form of the spring 135 disclosed above) in the travel of the wiper arm or center contact. The switch may include the ability to interface with an electronic power controller.

One embodiment uses push to turn rotary switches as user control for an electric cooktop. The switches may interface with an electric controller which in turn controls the power to the electric heating elements. The user then has the familiar and comfortable feel of a rotary switch while having the advantage of electronic cooking control.

Figure 5:
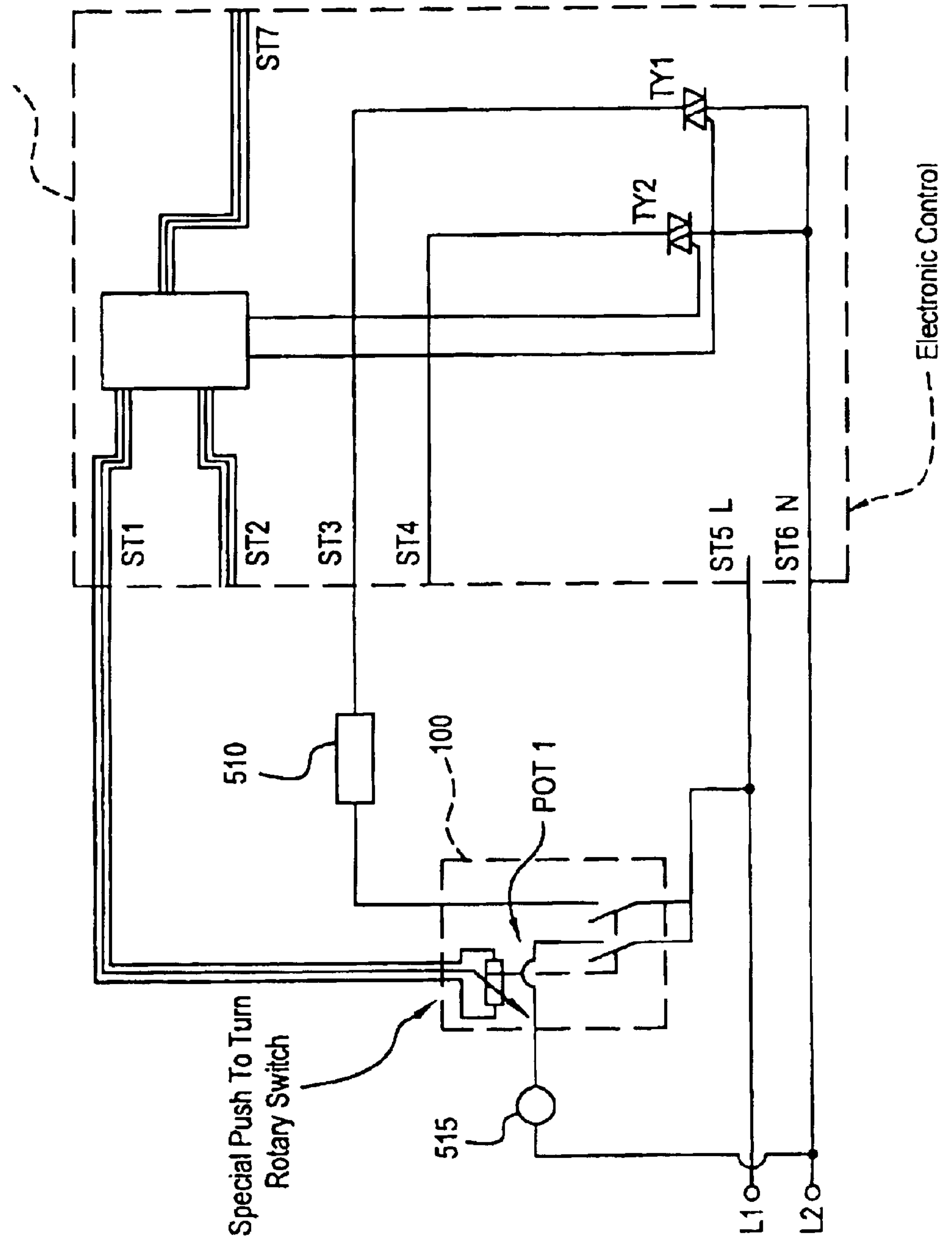
FIG. 5 is a block diagram of an embodiment of a cooking controller assembly.

FIG. 5 illustrates the embodiment of the cooking controller assembly. The cooking system may include a user interface that communicates with an electronic controller 505, which in turn modulates the power to the heater 510. The interface may include a push to turn rotary switch 100, which can be used to interface with an electronic heater controller 505. The details of the switch 100 are shown in more detail in FIGS. 1A–4 and are described above. By incorporating, for example, a push to turn on rotary switch, a user can cook using state of the art electronic controls while having the comfort and feel of a rotary switch. The two step on and one step off function (required for safety agency approvals of the cooking appliance) does not require redundant circuits. This mechanical means of switching on and off the heating element power eliminates the problems with insensitive to touch, incorrect or random switch actuation that can occur due to spills on the cooktop surface or placing pans or other items over or against the touch pad. No incorrect or random switch actuation occurs due to RF and e-field interference. Moisture on the glass has no effect on the switch action. The interface switch includes the ability to supply an adjustable analog signal to the microcontroller 505. The microcontroller 505 in turn can control the power being supplied to the heating elements 510. This allows the user to control the temperature of the heating element 510 very precisely such as, for example, medium and low temperatures. The rotary switch 100 is mechanically robust in design and resistant to damage due to either mechanical abuse and exposure to household chemicals.

The cooking controller assembly may include a heating element 510, a shaft assembly (not shown), a switch 100, and an electric controller 505. The heating element 510 is coupled to the switch 100 and the electric controller 505. The shaft assembly is coupled to the switch, and moved in a first direction and a second direction relative to the heating element 510 to selectively connect, through the switch 100, power to the heating element 510. The shaft assembly may include a knob, which is turnable by hand, see FIG. 2. The switch may include a push-to-turn switch, such as shown in FIG. 2. The electric controller 505 is coupled to the switch and the heating element 510, and electrically controls the power to the heating element 510 in relation to the movement in the first direction and/or the second direction of the shaft assembly. The controller 505 may comprise one or more microprocessors, microcontrollers, or other arrays of logic elements. Also, the electronic controller 505 may include Diehl's EU-PPS Control, Diehl's ULCL Control, etc. The movement in the first direction and the movement in the second direction may be in the same direction. The power to the heating element may be supplied from a single alternating current voltage supply.

The foregoing presentation of the described embodiments is provided to enable any person skilled in the art to make or use the present invention. Various modifications to these embodiments are possible, and the generic principles presented herein may be applied to other embodiments as well. As such, the present invention is not intended to be limited to the embodiments shown above, and/or any particular configuration of structure but rather is to be accorded the widest scope consistent with the principles and novel features disclosed in any fashion herein.

What is claimed is:

1. A switch assembly comprising: a shaft; a first switch and a second switch; a potentiometer including a first and a second terminal; and an electric controller, wherein the first switch is coupled to a first device, wherein the second switch is coupled to a second device, wherein the shaft is coupled to the first switch and the second switch, and to be moved to a first position to selectively connect power, through the first switch, to the first device, and to a second position to selectively connect power, through the second switch, to the second device, wherein the potentiometer is coupled to the shaft, and to provide a variable resistance between the first and the second terminal in relation to the movement of the shaft, and wherein the electric controller is coupled to the potentiometer, and to electrically control the power to at least one of the first device and the second device in relation to the variable resistance between the first and the second terminal of the potentiometer.

2. The switch assembly of claim 1, wherein the first position and the second position are the same position.

3. The switch assembly of claim 1, wherein the first device includes a heating element.

4. The switch assembly of claim 1, wherein the second device includes an indicator.

5. The switch assembly of claim 4, wherein the indicator includes a light.

6. The switch assembly of claim 1, wherein the power to at least one of the first device and the second device is supplied from a single alternating current voltage supply.

7. The switch assembly of claim 1, wherein the shaft includes a camshaft, and wherein the camshaft is coupled to the first switch, the second switch, and the potentiometer.

8. The switch assembly of claim 1, wherein the shaft is mechanically moved to the first position to selectively connect power to the first device, and to the second position to selectively connect power to the second device.

9. The switch assembly of claim 1, wherein the shaft includes a knob, which is turnable by hand.

10. The switch assembly of claim 1, wherein the shaft is manually moved to the first position to selectively connect power to the first device, and to the second position to selectively connect power to the second device.

11. The switch assembly of claim 1, wherein the shaft is adapted (i) to be moved to a third position to supply full power to at least one of the first device and the second device, (ii) to be pushed, and rotated to the first, the second, and the third position in a clockwise direction, and (iii) to be rotated back to the third position in a counterclockwise direction to signal to the electric controller to perform a predetermined task.

12. The switch assembly of claim 1, further comprising a spring, wherein the shaft includes a knob, which is turnable by a user, and wherein the spring is coupled to the shaft, and to mechanically indicate, through the tension of the spring, to the user the position of the shaft.

13. A switch assembly comprising: a shaft; a first switch and a second switch; a potentiometer including a first and a second terminal; and a controller, wherein the first switch is coupled to a first device, wherein the second switch is coupled to a second device, wherein the shaft is coupled to the first switch and the second switch, and to be manually pushed and turned (i) to a first position to selectively connect power, through the first switch, to the first device, and (ii) to a second position to selectively connect power, through the second switch, to the second device, wherein the potentiometer is coupled to the shaft, and to provide a variable resistance between the first and the second terminal in relation to the manual rotation of the shaft assembly, and wherein the controller is coupled to the potentiometer, and to control the power to at least one of the first device and the second device in relation to the variable resistance between the first and the second terminal of the potentiometer.

14. The switch assembly of claim 13, wherein the controller includes an electric controller, and wherein the electric controller is adapted to electrically control the power to at least one of the first device and the second device.

15. The switch assembly of claim 13, wherein the shaft is adapted to be manually turned to a third position to selectively disconnect power to at least one of the first device and the second device.

16. The switch assembly of claim 13, wherein the first device includes a heating element.

17. The switch assembly of claim 13, wherein the second device includes an indicator.

18. The switch assembly of claim 17, wherein the indicator includes a light.

19. The switch assembly of claim 13, wherein the power to at least one of the first device and the second device is supplied from a single alternating current voltage supply.

* * * * *